(12) United States Patent
Huff et al.

(10) Patent No.: US 7,325,652 B2
(45) Date of Patent: Feb. 5, 2008

(54) BUMPER/MUFFLER ASSEMBLY

(75) Inventors: Norman T. Huff, Novi, MI (US); Andrew W. Sanders, Auburn Hill, MI (US); Christopher J. Clements, Johnstown, OH (US); Juergen Wiemann, Leiferde (DE); Ronald Tomaszewski, Washington, MI (US); Larry J. Champney, Horton, MI (US); Robert L. Crawley, Ypsilanti, MI (US)

(73) Assignee: OCV Intellectual Capital, LLC DE (US)

( * ) Notice: Subject to any disclaimer, the term of this patent is extended or adjusted under 35 U.S.C. 154(b) by 250 days.

(21) Appl. No.: 10/749,281

(22) Filed: Dec. 31, 2003

(65) Prior Publication Data

US 2005/0023076 A1 Feb. 3, 2005

Related U.S. Application Data

(63) Continuation-in-part of application No. 09/992,254, filed on Nov. 6, 2001, now Pat. No. 6,668,972.

(51) Int. Cl.
*F16F 15/02* (2006.01)
*F01N 1/10* (2006.01)
*F01N 7/16* (2006.01)

(52) U.S. Cl. .................. 181/246; 181/252; 181/209

(58) Field of Classification Search ............. 181/246, 181/247, 248, 252, 256, 209
See application file for complete search history.

(56) References Cited

U.S. PATENT DOCUMENTS

| | | | | |
|---|---|---|---|---|
| 2,583,366 A | * | 1/1952 | Engels | 181/252 |
| 2,834,427 A | * | 5/1958 | Powers et al. | 181/243 |
| 2,992,035 A | * | 7/1961 | Tell et al. | 293/113 |
| 2,992,843 A | * | 7/1961 | Smith | 277/393 |
| 3,793,041 A | * | 2/1974 | Sowman | 501/103 |
| 3,810,636 A | * | 5/1974 | Gorski | 277/369 |
| 3,941,640 A | * | 3/1976 | Farnam et al. | 156/252 |
| 4,045,057 A | | 8/1977 | Halter | |
| 4,213,414 A | * | 7/1980 | Sato et al. | 440/89 R |
| 4,880,078 A | | 11/1989 | Inoue et al. | |
| 4,993,513 A | * | 2/1991 | Inoue et al. | 181/282 |
| 5,033,580 A | * | 7/1991 | Acerbis | 181/252 |
| 5,100,047 A | | 3/1992 | Nakagawa et al. | |
| 5,292,270 A | * | 3/1994 | Tucker et al. | 440/82 |
| 5,340,952 A | | 8/1994 | Takiguchi | |
| 5,480,706 A | * | 1/1996 | Li et al. | 428/113 |
| 5,656,376 A | * | 8/1997 | Rafferty et al. | 428/413 |
| 5,726,398 A | * | 3/1998 | Zahn et al. | 181/282 |
| 5,784,784 A | | 7/1998 | Flanigan et al. | |
| 5,955,707 A | * | 9/1999 | Fritz | 181/282 |

(Continued)

FOREIGN PATENT DOCUMENTS

| DE | 4326304 | 12/1994 |
|---|---|---|
| EP | 0 822 322 | 4/1998 |

(Continued)

*Primary Examiner*—Edgardo San Martin
(74) *Attorney, Agent, or Firm*—Inger H. Eckert; Margaret S. Millikin

(57) ABSTRACT

A bumper/muffler assembly is provided comprising a bumper; and a muffler having an outer shell. The outer shell may be formed from a non-high impact resistant material, such as a thin metal or a composite material. The muffler may comprise a separate element from the bumper, which is coupled thereto, or is formed as an integral part of the bumper.

42 Claims, 5 Drawing Sheets

U.S. PATENT DOCUMENTS

| | | | |
|---|---|---|---|
| 5,992,560 A * | 11/1999 | Matsuoka et al. | 181/252 |
| 6,465,110 B1 * | 10/2002 | Boss et al. | 428/608 |
| 6,543,577 B1 * | 4/2003 | Ferreira et al. | 181/282 |
| 2002/0079162 A1 | 6/2002 | Huff et al. | |

FOREIGN PATENT DOCUMENTS

| | | |
|---|---|---|
| WO | WO 99/27238 | 6/1999 |
| WO | WO 02/38419 | 5/2002 |

* cited by examiner

BUMPER/MUFFLER ASSEMBLY

RELATED APPLICATIONS

This application claims the priority of and is a continuation-in-part of U.S. Ser. No. 09/992,254 (Issued as U.S. Pat. No. 6,668,972) filed Nov. 6, 2001, entitled BUMPER/MUFFLER ASSEMBLY, by Norman Thomas Huff et al., the disclosure of which is incorporated herein by reference in its entirety.

TECHNICAL FIELD AND INDUSTRIAL APPLICABILITY OF THE INVENTION

This invention relates to a bumper/muffler assembly wherein a muffler, preferably made from a composite material, is associated with a vehicle bumper.

BACKGROUND OF THE INVENTION

U.S. Pat. No. 5,726,398 to Zahn et al. discloses a bumper/muffler assembly. A portion of the structure defining the muffler also forms part of the bumper and, hence, must be capable of absorbing high impact loads. If, after a certain period of vehicle operation, the muffler becomes defective and must be replaced, those defective parts must be replaced with costly parts capable of performing dual functions—attenuate acoustic energy and absorb high impact loads. The '398 patent also teaches that the bumper/muffler assembly may be formed from metal, see column 2, line 41. There are inherent limitations from a design standpoint regarding possible shapes and sizes for metal mufflers. Hence, the ability to design mufflers capable of being received in irregularly shaped vehicle recesses or cavities is restricted. It is also noted that the tooling costs for metal mufflers is very high, which is problematic where only a limited number of mufflers are to be produced, e.g., less than 100,000.

U.S. Pat. No. 6,543,577 discloses a silencer including a polymeric casing interconnecting an inlet pipe with an outlet pipe. A pair of heat resistant spacers in the form of bushings is located between an outer surface of the exhaust pipe and inner walls of the collars of the silencer. The bushings are formed of a heat resistant polymeric material and substantially seal the end of chamber 44 to provide resistance to heat transfer from the exhaust pipe to the casing from hot gases passing through the exhaust pipe. The bushings are flexible and soft relative to the casing and are capable of deforming to conform to irregularities in the shape of the exhaust pipe.

U.S. Pat. No. 5,340,952 discloses an exhaust muffler for an internal combustion engine formed of a synthetic resin material. An inner pipe is formed of a metallic material having a greater coefficient of thermal expansion than the muffler outer shell. Sliding movement may be allowed between a rear end of the sleeve member and inner pipe without breaking a substantially airtight engagement. A rear end of the sleeve member may be folded back inwardly and an annular member having a heat resistance and low coefficient of friction may be interposed between a folded back portion of the sleeve member and the rear end of the inner pipe so that they may slide over one another without excessive friction and transmission of heat from the inner pipe to the outer shell.

U.S. Pat. No. 4,045,057 illustrates a structure for interrupting the vibration along a pipeline or silencer shell, while structurally connection the parts together. The structure contains a series of spaced washer-shaped metal plates with vibration damping cushions, made of asbestos filled rubber, sandwiched between adjoining plates.

U.S. Pat. No. 4,880,078 discloses a muffler wherein the outlet end of the exhaust manifold is coupled to an upstream component unit through an elastomeric bushing. The bushing serves to dampen an exhaust vibration transmitted to the casing.

U.S. Pat. No. 4,993,513 illustrates a muffler having thermally resistant, heat insulation seals made of silicone rubber interposed between the outer ends of the attachment portions of the outer box of the muffler and the outer retainers of connecting members, which connect the muffler to the exhaust pipe. The seals also provide sound insulation.

U.S. Pat. No. 5,100,047 discloses a spacing ring that is placed between cooperating male and female tubular elements. The spacing rings provide space for expansion and contraction of the male and female elements and prevent direct contact between the elements to prevent undesirable noise. The spacing ring is made of matted threads or wires.

DE 4,326,304 illustrates a pipe-connecting element for the flexible connection of two pipes. The connecting element contains an annular band made of heat-shrinking plastic. The connecting element is fixed to the respective ends of the pipes and the annular band is melted to form a flexible connection between two pipes.

There is a need for an improved, low-cost composite muffler, which is capable of being associated with a vehicle bumper. Further, there is a need for a composite muffler associated with a vehicle bumper in which mechanical shock and vibration transmitted by the exhaust pipe of the muffler are reduced. Further, there is a need for a composite muffler associated with a vehicle bumper in which a thermal barrier between the exhaust pipe and shell of the composite muffler is provided to compensate for thermal expansion.

SUMMARY OF THE INVENTION

These needs are met by the present invention, wherein improved bumper/muffler assemblies are provided. In these assemblies, the muffler outer shell may be formed from a lightweight metal or a composite material. Such materials are typically less expensive than thicker metals designed to also absorb high impact loads. Composite outer shells are further advantageous as tooling costs for such parts are typically lower than for metal parts. Furthermore, composite outer shells can be more easily designed and formed into intricate shapes and sizes so as to be received in irregularly shaped vehicle recesses and cavities.

In accordance with a first aspect of the present invention, a bumper/muffler assembly is provided comprising a bumper, and a muffler having an outer shell formed from a composite material. The muffler is associated with the bumper. That is, the muffler is a separate element from the bumper but is coupled thereto or is formed as an integral part of the bumper. The perforated pipe may include openings formed by completely removing small metal portions from the pipe. Alternatively, the perforated pipe may comprise a louvered pipe, wherein the openings are formed by cutting and subsequently bending small sections of the pipe outwardly. The bent sections typically remain attached to the pipe.

The muffler further comprises a perforated pipe for receiving exhaust gases, and fibrous material provided within the outer shell between the perforated pipe and the outer shell. The muffler shell may comprise a single or multi-piece outer shell. For example, the muffler shell may comprise first and second shell parts.

The fibrous material may comprise first and second fibrous material preforms which are received respectfully in the first and second shell parts. Alternatively, the fibrous material may comprise a loose or bagged fluffed-up, wool-type product provided within an internal cavity of the outer shell. It is also contemplated that the fibrous material may comprise a mat product wrapped about the perforated pipe or otherwise filling the internal cavity of the outer shell.

The bumper/muffler assembly may further comprise a heat shield positioned between the bumper and the muffler outer shell and/or between the bumper and an exhaust pipe. It may also comprise at least one bushing for holding a portion of the perforated pipe within the outer shell. The assembly may additionally comprise a cover for securing the muffler to the bumper.

The bumper may comprise a main body having front, rear, upper and lower surfaces. The front surface faces away from a vehicle. The rear surface faces toward the vehicle. The upper surface faces away from ground and the lower surface faces toward ground. The main body further includes a recess formed in the rear surface and one of the upper or lower surfaces for receiving the muffler shell such that the main body provides impact protection for the muffler shell. A portion of the main body may define at least a part of an outer shell of the muffler.

In another embodiment of the invention, a bumper/muffler/exhaust pipe system is provided. The system includes a bumper including a composite muffler having a perforated pipe extending through the outer composite shell of the muffler. An exhaust pipe is connected to the perforated pipe for delivering gaseous emissions to the outside air. A steel collar, typically having a wide end and a narrow end, is fitted around the exhaust pipe at the narrow end. A bushing, made of a material having low thermal conductivity, is secured to the wide end of the collar and the muffler is attached to the bushing. The combination collar and bushing act as an interface between the composite muffler shell and the exhaust pipe to provide a thermal: and mechanical- shock barrier between the exhaust pipe and the composite muffler shell.

There are several other various methods of compensating for the difference in thermal expansion of the composite muffler shell, exhaust pipe and bushing material as well as providing cushioning to the bushing and composite muffler shell from mechanical shock vibrations.

In one embodiment, the composite muffler shell is designed so that the distance from the centerline of the exhaust pipe to the muffler shell is longer in the middle than at either end of the muffler. This allows flexibility in the composite muffler shell to adjust to differences in the amount of linear expansion/contraction the exhaust pipe undergoes during operation.

In another embodiment, the ends, or end caps, of the muffler are made of a material such as stainless steel. The end caps of the muffler attach directly to the composite muffler shell. The design does not require a bushing.

In another embodiment, the bushing is constructed of a variety of materials, i.e., in layers. For example, the first, inner layer of the bushing is made of a ceramic material to withstand high heat from the muffler. The second, middle layer may be constructed of a phenolic to withstand heat exposure. The third, outer layer may be constructed of a rubberized phenolic to provide a snug, expandable fit of the bushing to the interior of the muffler shell.

Other objects and advantages of the present invention will become apparent upon considering the following detailed description and appended claims, and upon reference to the accompanying drawings.

DETAILED DESCRIPTION AND PREFERRED EMBODIMENTS OF THE INVENTION

The present invention is directed to a muffler, which is associated with a vehicle bumper. For example, the muffler may be mounted to a vehicle bumper, preferably on the backside of a rear bumper (i.e., between the bumper and the car body), such that the muffler is protected from impact damage by the bumper and also by virtue of it not being a part of the vehicle with the least or nearly least clearance from the ground. Because the muffler is not subjected to high impact loads, the shell of the muffler can be formed from materials that do not have high impact resistant properties, such as some phenolic resins, examples noted below, and thin metals, e.g., stainless steels having a thickness less than about 1.5 mm. Further, the muffler may be longer than conventional mufflers, e.g., it may have a length up to almost the length of the bumper, e.g., greater than 60 inches, such that the muffler operates more efficiently, especially in dissipating low frequency acoustic energy.

Preferably, the embodiments of the muffler/exhaust pipe systems of the present invention are used in accordance with the bumper of an automobile as disclosed in U.S. Ser. No. 09/992,254 filed Nov. 6, 2001, which is hereby incorporated by reference in its entirety. It should be noted, however, that the muffler/exhaust pipe systems of the present invention may be used in any application where a muffler is typically used.

Figure 1:
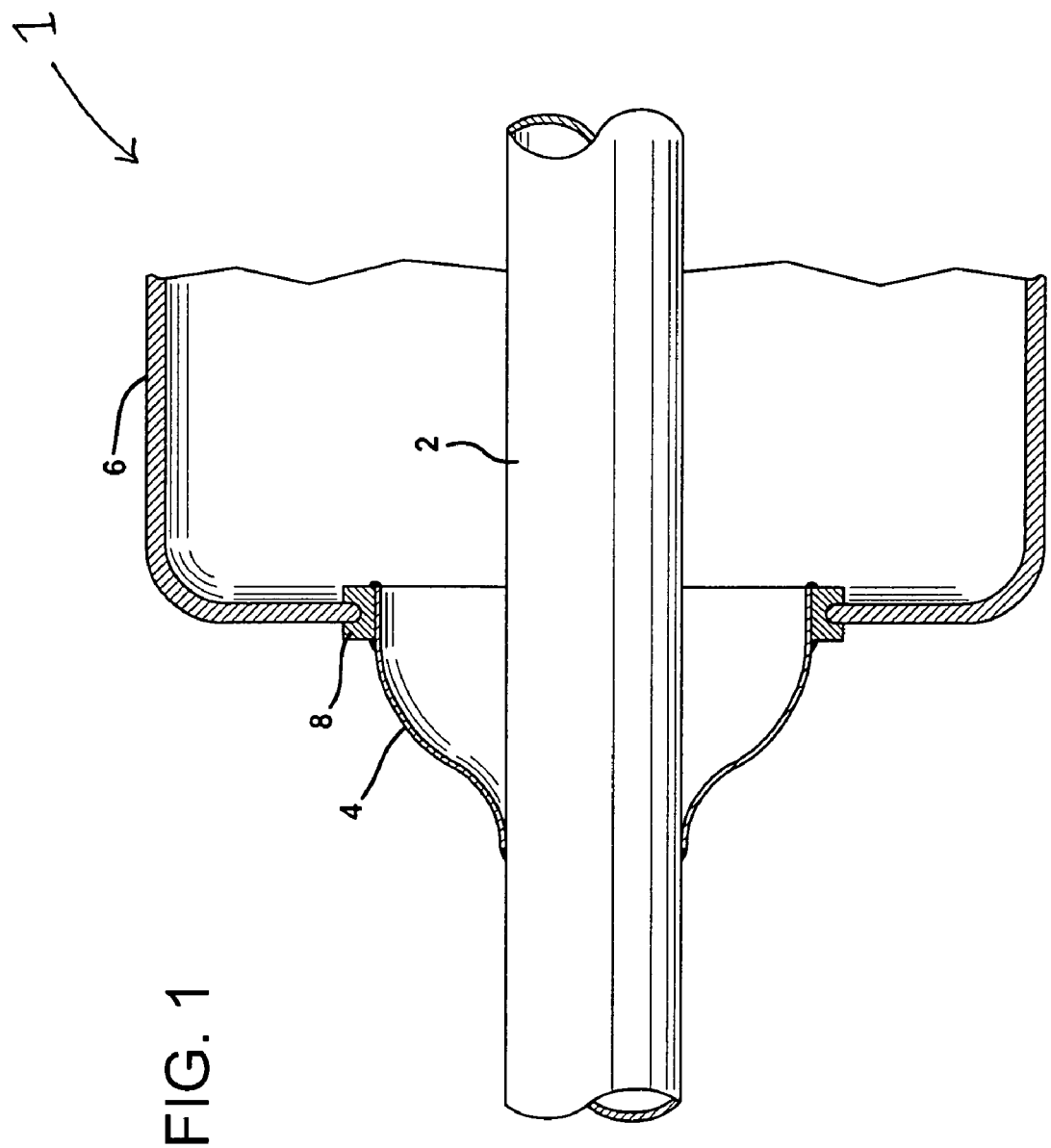
FIG. 1 is a cross-sectional view of an embodiment of the present invention.
Figure 2:
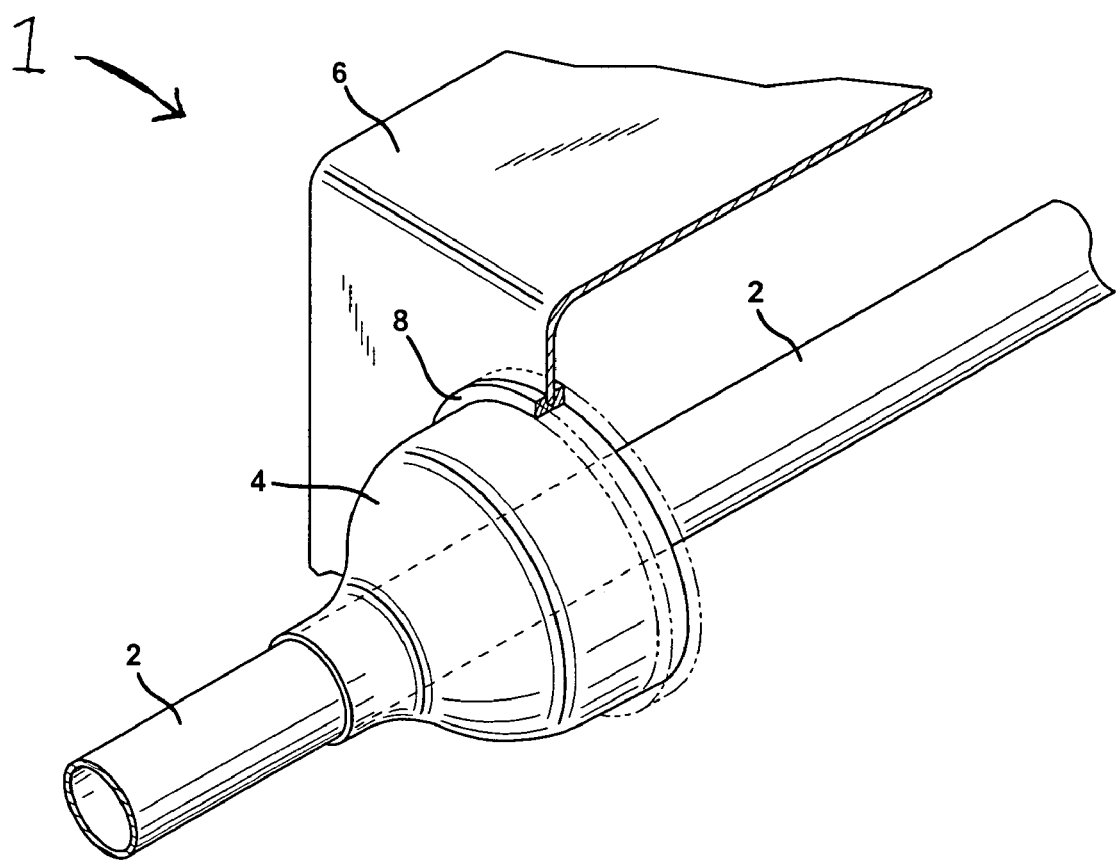
FIG. 2 is a perspective view of the embodiment of present invention as shown in FIG. 1.

Referring now to FIG. 1, cross-sectional view of the composite muffler/exhaust pipe system 1 is shown. The system 1 includes an exhaust pipe 2 having collar 4 attached to the exhaust pipe 2. The collar 4 is typically a conical shape and is attached to the exhaust pipe 2 by welding or clamping. As shown in FIG. 1, collar 4 has a narrow end, attached to the exhaust pipe 2 and a wide end to which the bushing 8 is secured. Muffler shell 6 is attached to the bushing 8. The combination collar 4 and bushing 8 act as an interface between the composite muffler shell 6 and the exhaust pipe 2 to provide a thermal and mechanical shock barrier between the exhaust pipe and the composite muffler shell. FIG. 2 shows a perspective view of the muffler/exhaust pipe system 1.

The muffler of the present invention preferably comprises a rigid outer shell formed from a composite material containing a resin material. The resin material may comprise any commercially available phenolic resin, including but not limited to phenol-formaldehyde resins such as novolac and resole resins; epoxy resins; vinyl ester resins; polyphenylene sulfide; high temperature nylons, one of which is commercially available from E.I. Du Pont de Nemours and Co. under the product designation "Zytel HTN", and another of which is commercially available from Amoco Performance Products, Inc. as polythalamide and sold under the product designation "Amodel"; nylon 6,6, one of which is commercially available from E.I. Du Pont de Nemours and Co. under the product designation "Zytel"; and polyetheretherketone (PEEK). The reinforcement fibers forming part of the outer shell 12 may comprise glass fibers (such as but not limited to E-glass and S-2 glass fibers), graphite fibers, aramid fibers such as those sold under the trademark KEVLAR®, carbon fibers, metallic fibers and/or ceramic fibers.

The composite muffler shell may be formed using a conventional injection molding or compression molding process wherein the reinforcement fibers and resin are combined prior to being injected or placed into the mold, or may be formed using any other known process for forming such parts. It is also contemplated that the muffler shell could be formed as a one piece shell via a blow molding, injection molding, compression molding, vacuum forming, squeeze molding, thermo-forming or like process.

The bushing 8 of the muffler/exhaust pipe system 1 can be a two-component bushing in which clamps may be used to secure the bushings around the collar 4. If single element bushings are used, their inner diameters may be sized so as to permit the collar 4 to be press-fitted into the bushing 8. The bushing 8 may welded, clamped or adhered to the collar 4 by an adhesive. Preferably the bushing 8 is formed from a polymeric or ceramic material. The bushing 8 may comprise a single, annular element formed from a ceramic material such as zirconia or a stabilized or modified zirconia or a high temperature polymer such as polytetraflouroethylene sold by E.I. Du Pont de Nemours and Co. under the product designation "TEFLON®", see International Application WO 99/27238A1, the disclosure of which is incorporated herein by reference; polyimide, sold by E.I. Du Pont de Nemours and Co. under the product designation "Vespel"; polyketone, sold by Amoco Performance Products, Inc. under the product designation "Kadel"; polyetheretherketone, sold by Victrex USA Inc. under the product designation "PEEK"; polyetherketone, sold by Victrex USA, Inc. under the product designation "PEK"; polyamide imide, sold by Amoco Performance Products, Inc., under the product designation "Torlon"; and a liquid crystal polymer sold by Amoco Performance Products, Inc. under the product designation "Xydar." The bushing may also be constructed of a heat resistant polyurethane material.

The combination collar and bushing functions to thermally protect or insulate the muffler shell 6 from energy in the form of heat transferred from high temperature exhaust gases passing through the exhaust pipe 2.

Collar 4 is attached to exhaust pipe 2 by means of welding or by standard muffler clamps (not shown). Collar 4 is preferably constructed out of stainless steel but may be made of any other heat resistant material such as a polymeric or ceramic material. As mentioned, collar 4 is generally a conical shape however the collar may be square or rectangular.

Figure 3:
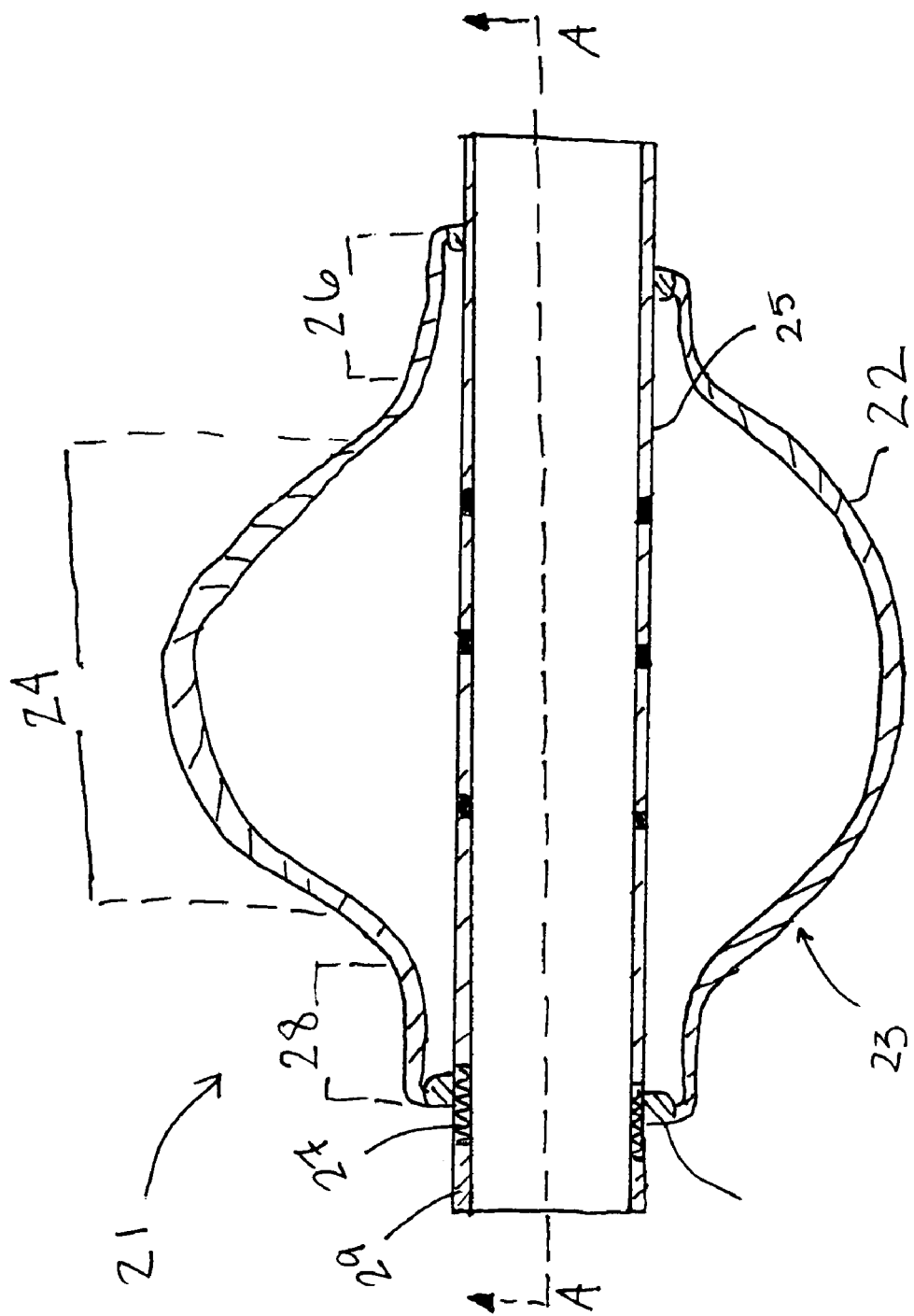
FIG. 3 is a cross-sectional view of another embodiment of the present invention.

In another embodiment of the present invention is shown in FIG. 3. The muffler/exhaust pipe system shown in FIG. 3 is used in conjunction with the bumper as described in U.S. patent application Ser. No. 09/992,254, which is incorporated by reference. For illustration purposes, the bumper is not shown in FIG. 3 of the present invention. As shown in FIG. 3 an exhaust/muffler assembly system 21 includes a muffler 23 having an outer shell 22 and a perforated pipe 25 extending through said outer shell 22. Exhaust pipe 29 is coupled to said perforated pipe 25 by flex section 27. The distance from a centerline A-A through said perforated pipe and said composite muffler shell is longer in the middle section 24 of said composite muffler shell than at either end 26,28 of said composite muffler shell 22. This allows flexibility in the composite muffler shell to adjust to differences in the amount of linear expansion/contraction the exhaust pipe undergoes during operation.

Figure 4:
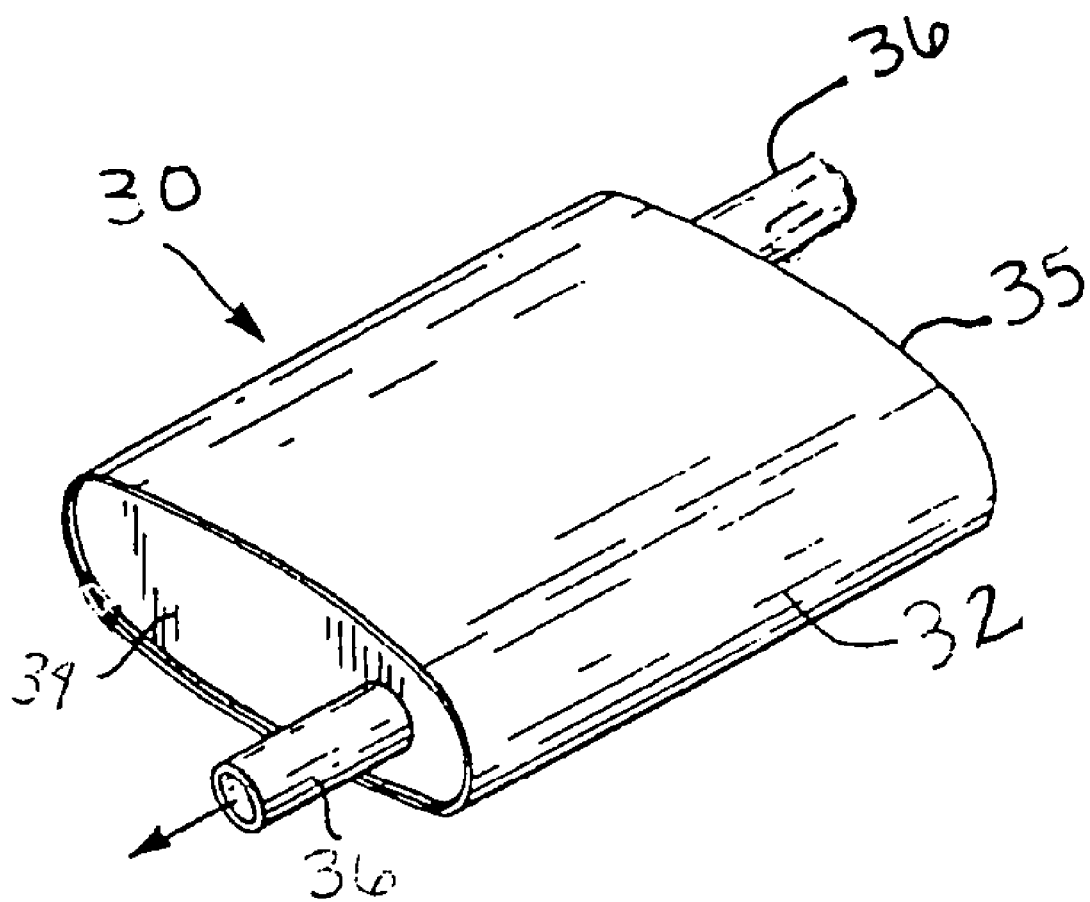
FIG. 4 is a perspective view of another embodiment of the present invention.

FIG. 4 shows another embodiment of the present invention. Muffler 30 is constructed of a composite shell 32 having end caps 34, 35. End caps 34, 35 are constructed of a metal material such as stainless steel or aluminum and are typically welded to inlet tube 36 and outlet tube 38 by welding. Muffler 30 does not require a bushing.

Figure 6:
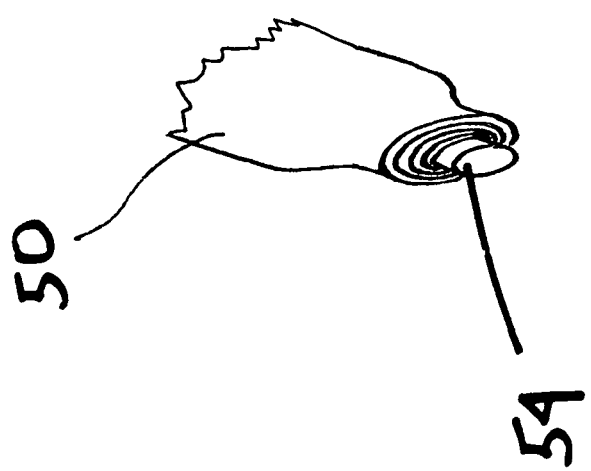
FIG. 6 is another perspective view of the present invention of FIG. 5.
Figure 5:
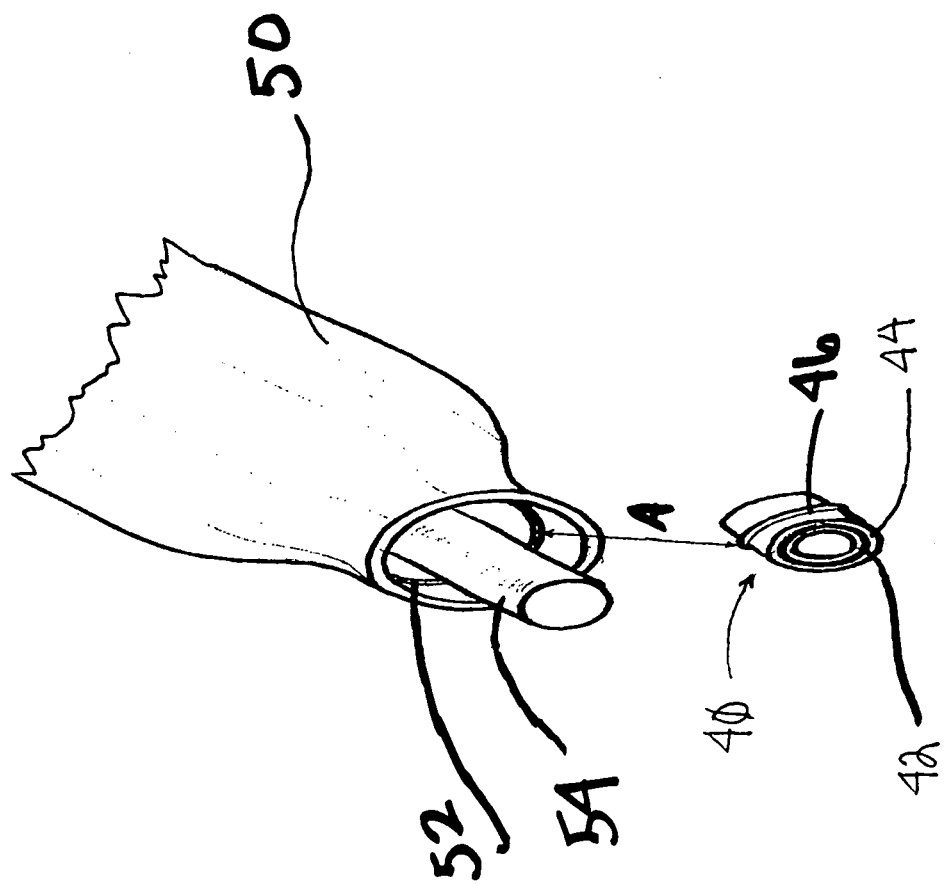
FIG. 5 is a perspective view of another embodiment of the present invention.

FIG. 5 and FIG. 6 illustrate another embodiment of the present invention. FIG. 5 shows a bushing 40 having constructed of multiple layers of materials. In FIG. 5, three layers of materials are shown however more or less than three layers may be utilized. The first, inner layer 42 in the bushing is made of a material that will withstand high heat from the muffler and perforated exhaust pipe 54. The first, inner layer is preferably made of a ceramic material. The second, middle layer 44 of bushing 40 is constructed of another material to withstand heat exposure and/or mechanical shock. Preferably, the material is a phenolic material. The third, outer layer 46 of bushing 40 is constructed of an expandable material, such as rubberized phenolic, to provide a snug, expandable fit to the muffler shell and provide gas tight properties to the bushing assembly. Optionally, and not shown, a forth layer, preferably made of a ceramic or titanium material could provide thermal shock resistance and a fifth layer, preferably made of stainless steel or coated with a copper alloy, zinc alloy, chromium or other known corrosion resistant metal could provide chemical corrosion resistance. FIG. 6 shows a detail the assembled muffler as shown in FIG. 5.

Outer layer 46 fits into groove 52 as shown by arrow A at the end of muffler shell 50 providing a snug fit of the bushing 40 to the composite muffler shell. Preferably the groove 52 is made of a flexible material such as rubberized phenolic. The inner layer 42 of bushing 40 is coupled to perforated exhaust pipe 54 preferably by clamps or bolts (not shown).

While the invention has been described in terms of preferred embodiments, it will be understood, of course, that the invention is not limited thereto since modifications may be made by those skilled in the art, particularly in light of the foregoing teachings.

What is claimed is:

1. A muffler/exhaust pipe system comprising:
   a muffler having an outer shell formed from a composite material wherein a perforated pipe extends through said outer shell;
   at least one exhaust pipe connected to said perforated pipe;
   a collar having a wide end and a narrow end wherein said narrow end is fined around said exhaust pipe;
   a multilayer bushing fitted round said wide end of said collar wherein said muffler shell is in contact with said bushing.

2. The muffler/exhaust pipe system as in claim 1, wherein said collar is clamped to said exhaust pipe.

3. The muffler/exhaust pipe system as in claim 1, wherein said collar is welded to said exhaust pipe.

4. The muffler/exhaust pipe system of claim 1, wherein said collar is constructed of steel.

5. The muffler/exhaust pipe system of claim 1, wherein said collar is a conically shaped collar.

6. The muffler/exhaust pipe of claim 1, wherein said bushing is constructed of materials selected from the group consisting of zirconia, stabilized or modified zirconia, polytetrafleuroethylene, polylmide, polyketone, polyetheretherketone, polyetherketone, and polyamide imide.

7. A muffler/exhaust pipe as set forth in claim 1, wherein said perforated pipe receives exhaust gases and fibrous material provided within said outer shell between said perforated pipe and said outer shell.

8. A muffler/exhaust pipe as set forth in claim 7, wherein said fibrous material comprises a needle felt material.

9. A muffler/exhaust pipe as set forth in claim 7, wherein said fibrous material comprises a loose wool-type product fed into said outer shell via a texturizing device.

10. A muffler/exhaust pipe as set forth in claim 7, wherein said muffler shell comprises first and second parts.

11. A muffler/exhaust pipe as set forth in claim 10, wherein said fibrous material comprises first and second fibrous material preforms which are received respectfully in said first and second shell parts.

12. A muffler/exhaust pipe as set forth in claim 1, wherein said muffler comprises a bumper/muffler assembly, and said bumper/muffler assembly further comprising a heat shield provided between said bumper and said muffler outer shell.

13. A muffler/exhaust pipe as set forth in claim 1, wherein said muffler comprises a bumper/muffler assembly, and said bumper/muffler further comprises a cover for securing said muffler to said bumper.

14. A muffler/exhaust pipe as set forth in claim 1, wherein said muffler comprises a bumper/muffler assembly, and said bumper/muffler comprises a main body having front, rear, upper and lower surfaces, said front surface facing away from a vehicle, said rear surface facing toward the vehicle, said upper surface facing away from ground and said lower surface facing toward ground, and said main body including a recess formed in said rear surface and one of said upper and lower surfaces for receiving said muffler shell such that said main body provides impact protection for said muffler shell.

15. A muffler/exhaust pipe as set forth in claim 14, wherein a portion of said main body defines at least a part of an outer shell of said muffler.

16. A bumper/muffler/exhaust pipe system comprising:
   a) a bumper/muffler assembly comprising a bumper, a muffler having an outer shell and a perforated pipe extending through said outer shell, said muffler being associated with said bumper;
   b) at least one exhaust pipe;
   c) a flex section for coupling said exhaust pipe to said perforated pipe;
      wherein the distance from a centerline through said perforated pipe and said composite muffler shell is longer in the middle section of said composite muffler shell than at either end of the composite muffler shell and
   d) a multilayer bushing having an outer surface engaging said outer shell and an inner surface engaging said flex section.

17. A bumper/muffler/exhaust pipe system as set forth in claim 16, wherein said flex section is secured to the exhaust pipe by a method selected from the group consisting of welding and clamping.

18. A bumper/muffler/exhaust pipe system as set out in claim 17, wherein said flex section extends only part way through said bushing and abuts said perforated pipe.

19. A bumper/muffler/exhaust pipe system as set out in claim 17, wherein said flex section extends completely through said bushing.

20. A bumper/muffler/exhaust pipe system as set out in claim 16, wherein said flex section comprises a flexible woven metal tube.

21. A bumper/muffler/exhaust pipe system comprising:
   a) a bumper/muffler assembly comprising a bumper,
   b) a muffler having a composite outer shell, said muffler being associated with said bumper, wherein said muffler further comprises metal ends caps at adjacent ends of said muffler;
   c) a perforated pipe extending through said outer shell
   d) at least one exhaust pipe coupled to said perforated pipe; and
   e) a multilayer bushing having an outer surface engaging said outer shell and an inner surface engaging said flex section.

22. A bumper/muffler assembly as set forth in claim 21, wherein said perforated pipe receives exhaust gases and fibrous material provided within said outer shell between said perforated pipe and said outer shell.

23. A bumper/muffler assembly as set forth in claim 22, wherein said fibrous material comprises a needle felt material.

24. A bumper/muffler assembly as set forth in claim 22, wherein said fibrous material comprises a loose wool-type product fed into said outer shell via a texturizing device.

25. A bumper/muffler assembly as set forth in claim 22, wherein said fibrous material comprises first and second fibrous material preforms which are received respectfully in said first and second shell parts.

26. A bumper/muffler assembly as set forth in claim 21, further comprising a heat shield provided between said bumper and said muffler outer shell.

27. A bumper/muffler assembly as set forth in claim 21, further comprising a cover for securing said muffler to said bumper.

28. A bumper/muffler assembly as set forth in claim 21, wherein said bumper comprises a main body having front rear, upper and lower surfaces, said front surface facing away from a vehicle, said rear surface facing toward the vehicle, said upper surface facing away from ground and said lower surface facing toward ground, and said main body including a recess formed in said rear surface and one of said upper and lower surfaces for receiving said muffler shell such that said main body provides impact protection for said muffler shell.

29. A bumper/muffler assembly as set forth in claim 28, wherein a portion of said main body defines at least a part of an outer shell of said muffler.

30. A bumper/muffler assembly as set forth in claim 21, wherein said metal material comprises stainless steel.

31. A muffler/exhaust pipe system comprising:
   a) a muffler having an outer shell formed from a composite material wherein a perforated pipe extends through said outer shell;
   b) at least one exhaust pipe connected to said perforated pipe;
   c) a multilayer bushing fitted around said exhaust pipe and in contact with the interior of said muffler, where said bushing comprises multiple layers of materials.

32. The muffler/exhaust pipe system of claim 31, wherein said bushing comprises at least three layers of materials.

33. The muffler/exhaust pipe system of claim 32, wherein a first, inner layer, fitted around said exhaust pipe, comprises a heat-resistant material.

34. The muffler/exhaust pipe system of claim 32, wherein said first, inner layer comprises a ceramic material.

35. The muffler/exhaust pipe system of claim 32, wherein a second, middle layer comprises a heat resistant material.

36. The muffler/exhaust pipe system of claim 35, wherein said second, middle layer comprises a phenolic material.

37. The muffler/exhaust pipe system of claim 32, wherein a third outer layer comprises an expandable material.

38. The muffler/exhaust pipe system of claim 37, wherein said third outer layer comprises a rubberized phenolic material.

39. The muffler/exhaust pipe system of claim 38, wherein said third outer layer comprises a raised bead around said second, inner layer.

40. The muffler/exhaust pipe system of claim 39, wherein said interior of said muffler comprises a groove for receiving said raised bead.

41. The muffler/exhaust pipe system of claim 40, wherein said groove comprises an elastomeric material.

42. The muffler/exhaust pipe system of claim 32, wherein said first, inner layer is welded to said exhaust pipe.

* * * * *